United States Patent
Zhao et al.

(10) Patent No.: US 12,461,525 B2
(45) Date of Patent: Nov. 4, 2025

(54) PLANAR ROBOTS DEAD-RECKONING WITH OPTICAL FLOW, WHEEL ENCODER AND INERTIAL MEASUREMENT UNIT

(71) Applicant: CEVA TECHNOLOGIES, INC., Mountain View, CA (US)

(72) Inventors: Zhanlue Zhao, Mountain View, CA (US); Douglas Charles Carlson, Mountain View, CA (US); Yun Li, Mountain View, CA (US); Bryan A. Cook, Silver Spring, MD (US)

(73) Assignee: CEVA TECHNOLOGIES, INC., Mountain View, CA (US)

( * ) Notice: Subject to any disclaimer, the term of this patent is extended or adjusted under 35 U.S.C. 154(b) by 218 days.

(21) Appl. No.: 18/042,945

(22) PCT Filed: Aug. 31, 2021

(86) PCT No.: PCT/US2021/048365
§ 371 (c)(1),
(2) Date: Feb. 24, 2023

(87) PCT Pub. No.: WO2022/051252
PCT Pub. Date: Mar. 10, 2022

(65) Prior Publication Data
US 2023/0333560 A1    Oct. 19, 2023

Related U.S. Application Data

(60) Provisional application No. 63/073,311, filed on Sep. 1, 2020.

(51) Int. Cl.
*G05D 1/00*    (2024.01)

(52) U.S. Cl.
CPC ......... *G05D 1/0212* (2013.01); *G05D 1/0253* (2013.01); *G05D 1/0272* (2013.01)

(58) Field of Classification Search
CPC .. G05D 1/0212; G05D 1/0253; G05D 1/0272; G05D 2105/10; G05D 2109/10;
(Continued)

(56) References Cited

U.S. PATENT DOCUMENTS

| | | |
|---|---|---|
| 8,972,057 B1 | 3/2015 | Freeman et al. |
| 10,131,052 B1 * | 11/2018 | Ibarz Gabardos ..... B25J 9/1697 |

(Continued)

FOREIGN PATENT DOCUMENTS

| | | |
|---|---|---|
| EP | 2927769 B1 | 12/2019 |
| WO | 2020121900 A1 | 6/2020 |

OTHER PUBLICATIONS

International Search Report/Written Opinion dated Dec. 1, 2021 in related/corresponding PCT Application No. PCT/US2021/048365.
(Continued)

*Primary Examiner* — Shardul D Patel
(74) *Attorney, Agent, or Firm* — PATENT PORTFOLIO BUILDERS PLLC (57) ABSTRACT

Systems and methods provide for estimating a trajectory of a robot by fusing a plurality of robot velocity measurements from a plurality of robot sensors located within a robot to generate a fused robot velocity based on the accuracy of those robot velocity measurements and applying Kalman filtering to the fused robot velocity to compute a current robot location.

21 Claims, 5 Drawing Sheets

(58) Field of Classification Search
CPC ............ G05D 2111/52; G05D 2111/54; G05D 2111/65; G05D 2111/67; G05D 1/2437; G05D 1/245; G05D 1/00; G01C 21/1656; G01C 21/16; G01C 21/28; B25J 9/161; B25J 9/1664; B25J 11/0085; B25J 19/02
USPC .......................................................... 701/23
See application file for complete search history.

(56) References Cited

U.S. PATENT DOCUMENTS

| | | | |
|---|---|---|---|
| 2004/0073337 A1* | 4/2004 | McKee | G05D 1/0251 700/245 |
| 2008/0004796 A1 | 1/2008 | Schott et al. | |
| 2010/0088030 A1 | 4/2010 | Stephens et al. | |
| 2012/0219207 A1 | 8/2012 | Shin et al. | |
| 2014/0195185 A1 | 7/2014 | Anderson | |
| 2016/0052136 A1 | 2/2016 | Khripin et al. | |
| 2019/0150692 A1 | 5/2019 | Yoon et al. | |
| 2020/0004260 A1 | 1/2020 | Kim et al. | |

OTHER PUBLICATIONS

Jingang Yi et al., "Kinematic Modeling and Analysis of Skid-Steered Mobile Robots With Applications to Low-Cost Inertial-Measurement-Unit-Based Motion Estimation," IEEE Transactions on Robotics, Oct. 5, 2009, pp. 1087-1097, vol. 25, No. 5.
Michael Dille et al., "Outdoor Downward-facing Optical Flow Odometry with Commodity Sensors," Conference Paper—Jan. 2009, pp. 1-10.
Ronald P. M. Chan et al., "Characterisation of Low-cost Optical Flow Sensors," 2010, Proceeding of Australasian Conference on Robotics and Automation, Brisbane, Australia, 9 pages.
Extended European Search Report dated Feb. 29, 2024 in corresponding/related European Application No. 21864971.3.
Stephen Oonk et al., "Extended Kalman Filter for Improved Navigation with Fault Awareness," 2014 IEEE International Conference on Systems, Man, and Cybernetics, Oct. 5-8, 2014, San Diego, CA, USA, pp. 2681-2686.
Office Action dated Jul. 1, 2025 in corresponding/related Japanese Application No. 2023-514465.

* cited by examiner

PLANAR ROBOTS DEAD-RECKONING WITH OPTICAL FLOW, WHEEL ENCODER AND INERTIAL MEASUREMENT UNIT

RELATED APPLICATION

The present application is a U.S. National Stage Application of PCT/US2021/048365 filed Aug. 31, 2021, which relates to, and claims priority from, U.S. Provisional Patent Application No. 63/073,311 filed Sep. 1, 2020, entitled "PLANAR ROBOTS DEAD-RECKONING WITH OPTICAL FLOW, WHEEL ENCODER AND INERTIAL MEASUREMENT UNIT", the disclosure of which is incorporated here by reference.

TECHNICAL FIELD

Embodiments of the subject matter disclosed herein relate to navigation in planar robots.

BACKGROUND

Planar robots move on planes and are utilized in applications such as robot vacuum cleaners. Dead-reckoning navigation and simultaneous localization and mapping (SLAM) in planar robots utilize an inertial measurement unit (IMU), an optical flow (OF) sensor and wheel encoders (WE). The IMU, which typically contains an accelerometer and a gyroscope, provides the relative heading and linear acceleration of the planar robot. The OF sensor and WE provide the speed of the planar robot. Dead-reckoning is used to compute the trajectory of the planar robot by updating a current position estimate with the current speed and the previous position of the planar robot.

Although the OF sensor and WE can provide the speed of the planar robot, the measurements provided by the OF sensor and WE are prone to errors and failures. For example, an OF sensor can fail completely if the image quality of the OF is too low. In addition, wheel slips are a common cause of measurement errors for WE. For dead-reckoning navigation, accuracy of the speed estimates determines the position error growth rate; therefore, fusing sensors and obtaining accurate speed estimates are essential for navigating across heterogenous surfaces (e.g., rugs, tile, wood). Accordingly, there is still room for improvement in the navigation of planar robots.

SUMMARY

Exemplary embodiments are directed to systems and methods that provide for navigation in planar robots. The linear acceleration from IMU and speeds from the OF sensor and WE are fused to achieve a robust and accurate dead-reckoning position estimate. Bad sensor measurements are rejected, or both OF sensor and WE measurements are combined properly with respect to their accuracies. Measurements from the OF sensor and WE may not be consistent with robot motion, and the errors in the OF sensor and WE depend on running conditions. However, the linear acceleration of the IMU is always consistent with robot motion. In addition, although the speed derived from the linear acceleration suffers from a quickly growing integration error, this derived speed becomes comparable with the speeds measured by the OF sensor and WE without motion inconsistency errors in a feature domain through signal processing. Moreover, the weight of sensor measurements can be derived with respect to their accuracies.

According to an embodiment there is a method for estimating a trajectory of a robot. The method comprising: fusing a plurality of robot velocity measurements from a plurality of robot sensors located within a robot to generate a fused robot velocity; and applying Kalman filtering to the fused robot velocity and measured linear acceleration from an inertial measurement unit to compute a current robot location.

According to an embodiment there is a robot configured for estimating a trajectory of a robot. The robot comprising: at least one processor configured to fuse a plurality of robot velocity measurements from a plurality of robot sensors located within a robot to generate a fused robot velocity; and the at least one processor configured to apply Kalman filtering to the fused robot velocity and measured linear acceleration from an inertial measurement unit to compute a current robot location.

BRIEF DESCRIPTION OF THE DRAWINGS

The accompanying drawings illustrate exemplary embodiments, wherein.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

As used herein, a variable displayed in bold text denotes a matrix or vector. Whether the variable is a matrix or vector can be inferred from the context. For a variable $_b^A x_k^c$, x stands for the quantity of interest, e.g., linear acceleration or velocity. The quantity A is the frame or coordinate in which x is, e.g., user frame or inertial measurement unit (IMU) frame, and the quantity b is the location with which x is associated, e.g., where the IMU or optical flow (OF) senor is located. The quantity c is the sensor by which x is measured, e.g., OF or wheel encoder (WE).

In general, the following symbols and variables are used throughout this specification:

I IMU body frame.
i, o, w Locations of the IMU, OF, and WE sensors on the robot.
U The user frame.
ω The angular velocity of the robot as $[0\ 0\ \Omega_z]$.
$_{oi}^I r$ The displacement from OF to IMU in the IMU frame.
$_{wi}^I r$ The displacement from WE to IMU in the IMU frame.
$_i^U a_k^i$ The acceleration at the location of IMU in the user frame U, measured by IMU at time k.
$_i^U v_k^o, _i^U v_k^w$ The velocities at the location of IMU in the frame U, measured by OF and W at time k.
$_i^U v_k$ The true velocity at the location of IMU in the user frame U at time k.

$_i{}^U v_k^f$ The fused velocity at the location of IMU in the user frame U at time K.

$_v\Gamma_k^{OF}, _v\Gamma_k^{WE}$ The features computed from $_i{}^U v_k^o$ and $_i{}^U v_k^w$ in velocity domain.

N(x; m, Φ) The Gaussian distribution of x with mean m and covariance Φ.

Exemplary embodiments provide improved navigation of planar robots. Suitable planar robots include, but are not limited to, a robot vacuum cleaner (RVC). In general, a RVC system contains two wheels, a left wheel and a right wheel, each with their own encoders and driven by two independent motors. A description of how robotic vacuums work is found at https://electronics.howstuffworks.com/gadgets/home/robotic-vacuum1.htm, the entire contents of which are incorporated herein by reference.

Figure 1:
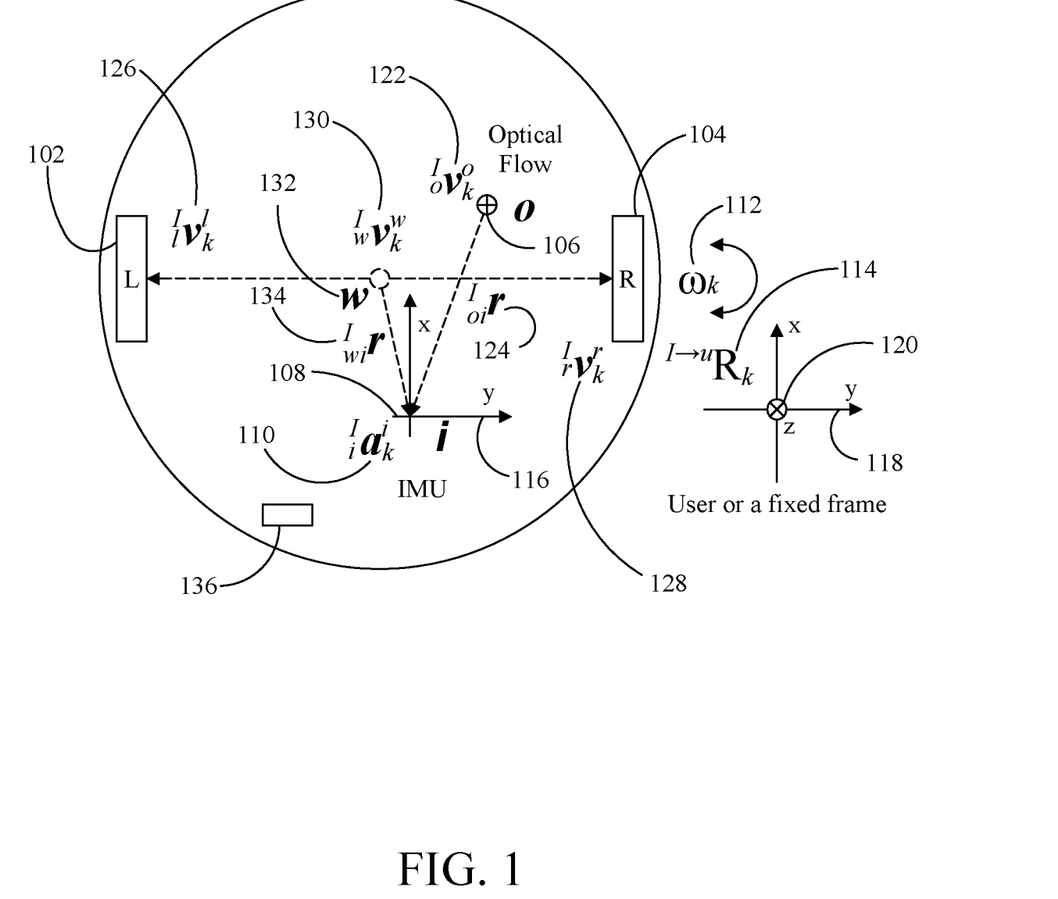
FIG. 1 is a schematic representation of a robot according to an embodiment.

Referring initially to FIG. 1, an embodiment of a robot 100 is illustrated. The robot includes a left wheel 102 containing a left wheel encoder (WE) sensor and a right wheel 104 containing a right wheel (WE) encoder sensor. The robot also includes an optical flow (OF) sensor 106 and an IMU 108. The IMU 108 contains an accelerometer and a gyroscope and measures the acceleration $_i{}^I a_k^i$ 110 at the location of the IMU, the angular velocity $\omega_k$ 112, and the angular position $^{I \to U}R_k$ 114 or quaternion $q_k$ which is the rotation that rotates the IMU frame 116 to the user frame 118 or a fixed frame with z-axis 120 extending in the direction of gravity. For a planar robot, it is also the angular position of the robot. In $_i{}^I a_k^i$ and $^{I \to U}R_k$, I and U stands for the IMU frame and the user frame. The left subscript i indicates the quantity is associated with the location of the IMU 108, and the right superscript i indicates the quantity is measured by the IMU 108. The discrete time is indicated by k.

The OF sensor 106 measures the pixel motion in the OF body frame, which is the relative distance that the sensor moves between two consecutive register readings. When sampled with a constant period, the OF sensor 106 can be treated as a velocity sensor. The OF sensor 106, which is calibrated, measures the velocity 122 at the location of the OF sensor 106, which is denoted as $_i{}^U v_k^o$. The displacement from the OF sensor 106 to the IMU 108 in the IMU frame is denoted $_{oi}{}^I r$, which is constant in the IMU frame.

After calibration, the left and right WE sensors measure the velocities at the locations of the left wheel 126 and the right wheel 128 in the IMU frame, respectively, which are denoted as $_l{}^I v_k^l$ and $_r{}^I v_k^r$. On a planar robot, these two wheels can only move forward or backward. The average of $_l{}^I v_k^l$ and $_r{}^I v_k^r$ is the robot velocity 130 at the middle w 132 between two wheel centers, which is denoted as $_w{}^I v_k^w$. The displacement 134 from the location w to the IMU 108 in the IMU frame is $_{wi}{}^I r$. The robot 100 also includes at least one processor 136 for performing the various calculations and implementing instructions associated with the embodiments described herein.

An optical flow sensor measures changes in position by optically acquiring sequential surface images (frames) and mathematically determining the speed and the direction of motion, employing a low resolution, high frame rate camera to capture images of a surface. Consecutive images are fed to an image processing algorithm that produces delta X and Y, the change in position during the intervening interval. A familiar application of an optical flow sensor is in a computer mouse, where the image sensor and processing algorithm are incorporated into a single chip.

The accuracy of the OF measurements are light source and surface texture dependent. A suitable OF sensor 106 for some embodiments is the PixArt Imaging PAA 5101 that has both light amplification by stimulated emission of radiation (LASER) and light emitting diode (LED) light sources. When LASER is chosen for illumination, the Image Quality value is high when tracking on tiles and is low when tracking on carpets. On the contrary, when LED is chosen, the Image Quality is high when tracking on carpets and is low when tracking on tiles. Because the sensor operates by measuring optical flow, surfaces which cause the patterns of light intensity to behave differently will result in inaccurate measurements. Therefore, specular reflection from the surface will impact the measurements as described in Ronald P. M. Chan et al., "Characterization of Low-cost Optical Flow Sensors", Proceeding of Australasian Conference on Robotics and Automation, Brisbane, Australia, (2010) and "Outdoor downward-facing optical flow odometry with commodity sensors." In: Howard A, Iagnemma K, Kelly A (eds) Field and service robotics, Springer tracts in advanced robotics, vol 62, Springer, Berlin, p 183-193. In order to provide for the fusion of measurements from different sensors, the failures of the OF sensor need to be reliably detected, and the accuracy of the OF sensor needs to be assessed when the OF sensor is running on different surfaces.

Regarding the accuracy of the WE, a robot is usually equipped with wheel odometry to measure its moving distance. The accuracy of the WE measurements are terrain surface dependent and are subject to many sources of errors as described in "Introduction to Autonomous Mobile Robots", R. Siegwart and I. Nourbakhsh, MIT Press (2004). These sources of errors include limited resolution during integration (time increments, measurement resolution, etc.), misalignment of the wheels (deterministic), unequal wheel diameter (deterministic), variation in the contact point of the wheel, unequal floor contact (slipping, non-planar surface, etc.), and robot collision and bump induced error. These errors adversely affect the reliability of the WE sensor measurements. These deterministic errors can be significantly reduced by dynamic wheel encoder calibrations. For the other errors, accuracy needs to be estimated for sensor fusion.

An IMU 108 provides the orientation and linear acceleration of the robot. The heading changes of a robot can be derived from the orientation. The linear acceleration usually contains the zero-gravity-offset (ZGO) and gravity residuals. Consequently, the direct integration of the linear acceleration suffers from severe integration errors. However, the accuracy of the IMU's linear acceleration is not subject to variations in terrains and surface textures. In other words, the linear acceleration measurements are always consistent with robot motion. After filtering and signal processing, the linear acceleration derived from the IMU 108 is used to detect OF and WE sensor failures and assess their accuracies.

Figure 2:
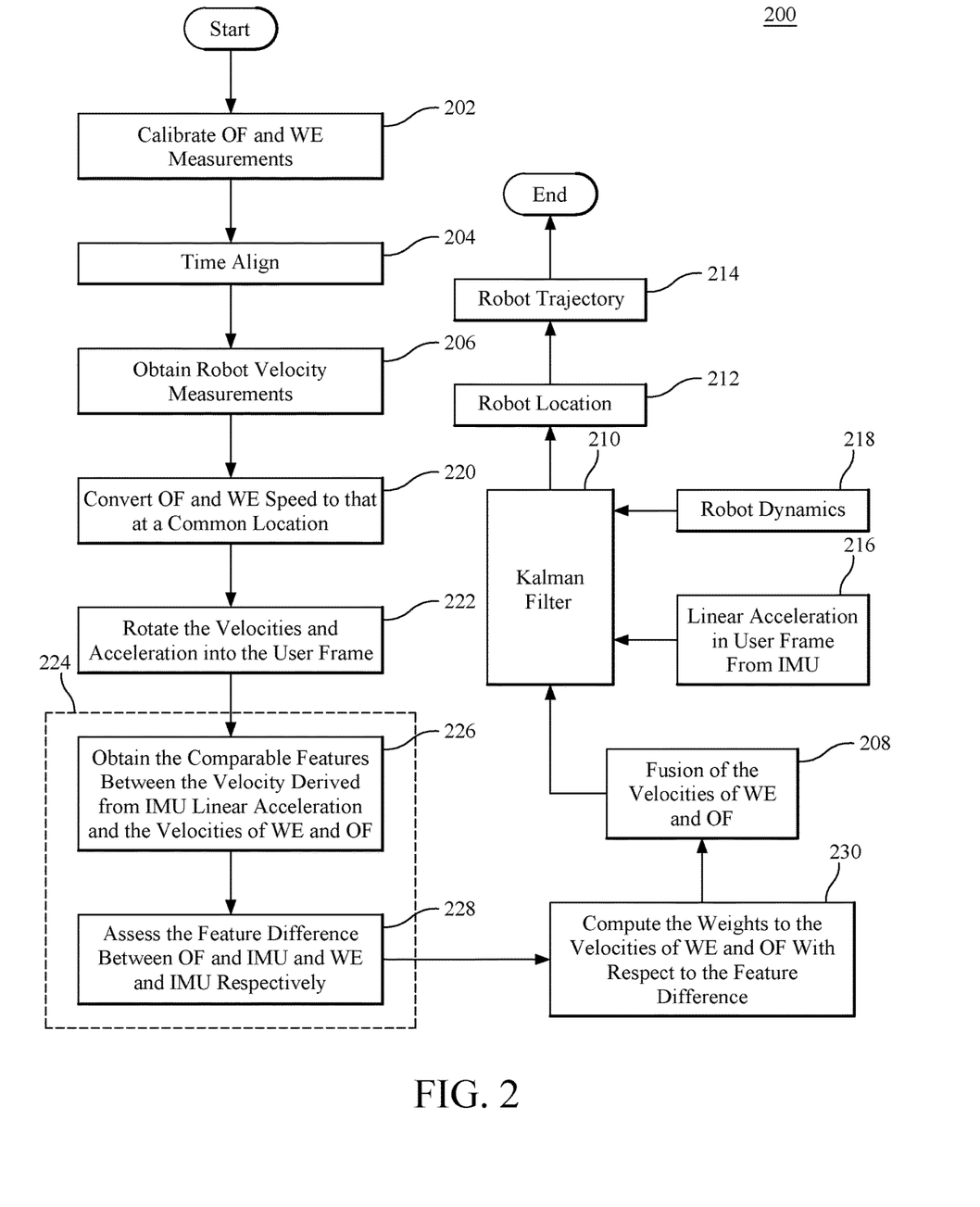
FIG. 2 is flow chart illustrating a method for estimating a location of a robot according to an embodiment.

Referring to FIG. 2, an exemplary embodiment of a method for estimating the current position of a robot 200 with good accuracy is illustrated. The method fuses the velocity measurements from a plurality of robot sensors and uses the fused velocity in a Kalman filter to estimate the current position. When performed over time, the current positions define the robot trajectory. Suitable robots include, but are not limited to, planar robots. In one embodiment, the robot is an RVC. Initially, each robot sensor in the plurality of robot sensors is calibrated. In one embodiment, a given robot sensor is calibrated at step 202 using nominal calibration methods provided by the original equipment manufacturer (OEM) of that given robot sensor. Alternatively, a given robot sensor is calibrated using an in-house advanced calibration method. Suitable robot sensors include OF sensors and WE sensors as described above. The calibrated robot sensors are time aligned at step 204. A robot velocity measurement is obtained from each robot sensor at step 206. In one embodiment, an OF sensor velocity measurement is obtained, and at least one WE sensor velocity measurement is obtained. In one embodiment, two separate WE sensor velocity measurements are obtained, and the two separate WE sensor velocity measurements are averaged to generate a composite WE sensor velocity measurement. The composite WE sensor velocity measurement is associated with the center of the axes between the left and right wheels, most of, which is also a center of the body of the robot.

The robot velocity measurements from the plurality of robot sensors are then fused or combined at step 208. In one embodiment, the combination is a weighted combination or weighted sum of the plurality of robot velocity measurements. The fused robot velocity measurements are then processed by a Kalman filter at step 210, i.e., subjected to Kalman filtering, to estimate a current robot location at step 212. Collection and fusion of the robot velocity measurements and processing of the fused velocity measurements with Kalman filtering can be repeated iteratively. This generates a history of current robot locations that can be used to determine a robot trajectory at step 214 over a given time period. In one embodiment the fused robot velocity measurements are processed by the Kalman filter in combination with the linear acceleration obtained from the IMU 108 at step 216 and expressed in the user frame of reference and robot dynamics at step 218.

Since each robot sensor measures quantities at the physical location of that robot sensor and the IMU 108 measures the linear acceleration at the location of the IMU, in one embodiment, the robot velocity measurements, e.g., the OF sensor velocity measurement and the WE sensor velocity measurements, are converted, transformed or translated from the robot velocity measurements at the location of each robot sensor to robot velocity measurements at a common location within the robot at step 220. In one embodiment, the robot velocity measurements are converted to an arbitrary common location. In one embodiment, each robot velocity measurement is converted from the location of each robot sensor to a corresponding robot velocity measurement at the location of the IMU within the robot. Therefore, each robot velocity measurement is translated from a robot sensor location frame of reference to the IMU location frame of reference.

Different conversion choices for converting the robot velocity measurements will introduce different conversion errors. In one embodiment, all quantities from the robot velocity measurements are converted to the location of IMU, i.e., the OF sensor velocity measurement and the WE sensors velocity measurements are converted to the location of IMU. On a rigid body, the velocity at a second location, b, is computed from the velocity at a first location, a, using the rigid body angular velocity and displacement from a to b. This is expressed in the following rigid body conversion equation (1):

$$_b^B v = {_a^B} v + \omega \times {_{ab}^B} r \quad (1)$$

where $_b^B v$ and $_a^B v$ are the velocities at the location b and location a, respectively, $\omega$ is the angular velocity of the rigid body, and $_{ab}^B r$ is the displacement from a to b in the body frame. The velocity conversion equation holds in the user frame.

In one embodiment, the robot velocity measurements, i.e., the OF sensor velocity measurement and the WE sensors velocity measurements are converted to the location of the IMU using the rigid body conversion equation. The corresponding velocities at IMU computed from the OF sensor and WE sensors are shown in equations (2) and (3):

$$_o^I v^o = {_o^I} v^o + \omega \times {_{oi}^I} r \text{ and} \quad (2)$$

$$_o^I v^w = {_o^I} v^w + \omega \times {_{wi}^I} r \quad (3)$$

where $_o^I v^o$ and $_o^I v^w$ are the velocities from the OF sensor and WE at their own locations in the IMU frame, respectively, and $_o^I v^o$ and $_o^I v^w$ the corresponding velocities at the location of IMU.

The resulting robot velocity measurements in the IMU frame of reference are then converted to corresponding robot velocity measurements in a user frame of reference at step 222. The user frame of reference is a frame of reference associated with a user of the robot. In one embodiment, the quaternion or rotation matrix from the IMU provides the rotation from IMU frame to the user frame or a fixed coordinate frame. With such a quaternion q, the velocities $_o^I v^o$ and $_o^I v^w$ at the location of IMU is converted into the following user coordinates as shown in equations (4) and (5):

$$_i^U v^o = q \otimes {_i^I} v^o \quad (4)$$

$$_i^U v^w = q \otimes {_i^I} v^w \quad (5)$$

In addition, measurements from the IMU 108 are translated to the user frame of reference. In one embodiment, the linear acceleration from the IMU 108 in the user frame of reference is computed as follows as shown in equation (6):

$$_i^U a^i = q \otimes {_i^I} a^i \quad (6)$$

The accuracy of sensor measurements from the plurality of robot sensors, e.g., OF sensors and WE sensors, are dependent upon the running or operating conditions of the robot 100. The accuracy of one type of robot sensor under given running or operating conditions can be different than another type of robot sensor under the same running or operating conditions. Therefore, certain types of robot sensors will have greater accuracy than other types of robot sensors under common operating conditions. Therefore, the accuracy of each sensor measurement from each robot sensor is determined based on the running conditions at step 224, and this accuracy is used in determining how to combine or to fuse the robot velocity measurements for use in Kalman filtering.

Given that IMU measurements are immune or agnostic to the running conditions of robot, in one embodiment, IMU linear acceleration measurements in a feature space are used to access or to determine the accuracies of the plurality of robot velocity measurements reliably. Weights to be applied to the robot velocity measurements from each robot sensor, the OF sensor and the WE sensors, are computed with respect to the accuracies associated with those velocity measurements. In addition to the robot velocity measurements obtained from the robot sensors, a robot velocity is derived from the linear acceleration of the robot that is obtained from the IMU. Features are defined for the purpose of comparing the velocities obtained from the robot sensors to velocities calculated from the IMU derived linear acceleration. According to some embodiments, a feature is generated by a DC-Block filter which transforms a velocity signal, wherein the velocity signal is generated by one of the optical flow sensor, the wheel encoder or the inertial measurement unit.

Comparable features from the linear acceleration derived robot velocity and the robot velocity measurements from the plurality of robot sensors are computed and compared for different domains, e.g., a velocity domain and a position domain at step 226. Differences between the comparable features are identified between the IMU and each robot sensor at step 228. These differences express the accuracy of the velocity measurements from each robot sensor and are used to weight the contribution of each robot velocity measurement in the fusion of velocity measurements at step 230. Therefore, fusing the robot velocity measurements uses a weighted sum of the robot velocity measurements of each robot sensor based on the accuracy of each robot sensor under current running or operating conditions of the robot.

Since the linear acceleration from the IMU is immune to errors induced by the running conditions that adversely affect the OF sensor and WE sensors, the linear acceleration is used to assess the accuracies of $_i^U v^w$ and $_i^U v^o$. Expressing the true velocity at the location of the IMU as $_i^U v_k$ at instant k, yields the following relationships between the velocities obtained from the OF sensor and WE sensors and the true velocity as shown in equation (7):

$$\begin{cases} _i^U v_k^o = {}_i^U v_k + n_k^o \\ _i^U v_k^w = {}_i^U v_k + n_k^w \end{cases} \quad (7)$$

where $n_k^o$ and $n_k^w$ represent the sensor noises. Moreover, if $_i^U a_k^i$ is ideal without errors, the velocity derived from the linear acceleration is expressed by the following equation (8):

$$_i^U v_k^i = {}_i^U v_0^i \Sigma_{j=1}^k {}_i^U a_j^i * T \quad (8)$$

The calculated velocity, $_i^U v_k^i$, is close to the true velocity, $_i^U v_k$. Thus, $_i^U v_k^i \cong {}_i^U v_k^o$ and $_i^U v_k^i \cong {}_i^U v_k^w$, with ≅expressing the effect of sensor errors. Stated another way, the velocity $_i^U v_k^i$ derived from the linear acceleration $_i^U a_k^i$, and $_i^U v_k^o$ are comparable or similar without running condition induced errors. The same goes for $_i^U v_k^i$ and $_i^U v_k^w$. However, $_i^U a_k^i$ usually contains ZGO and gravity residuals. Integration of $_i^U a_k^i$ accumulates these errors quickly, making the calculated velocity far different from the true velocity and invalidating the above assumptions.

To overcome the integration divergence due to the ZGO and gravity residual contained in the acceleration, a DC-block filter is applied before and after each integration operation so that only the signal variation is kept. A DC-block filter is a recursive filter specified by the difference equation (9):

$$y(n) = (x(n) - x(n-1))(1+a)/2 + ay(n-1) \quad (9)$$

Figure 3:
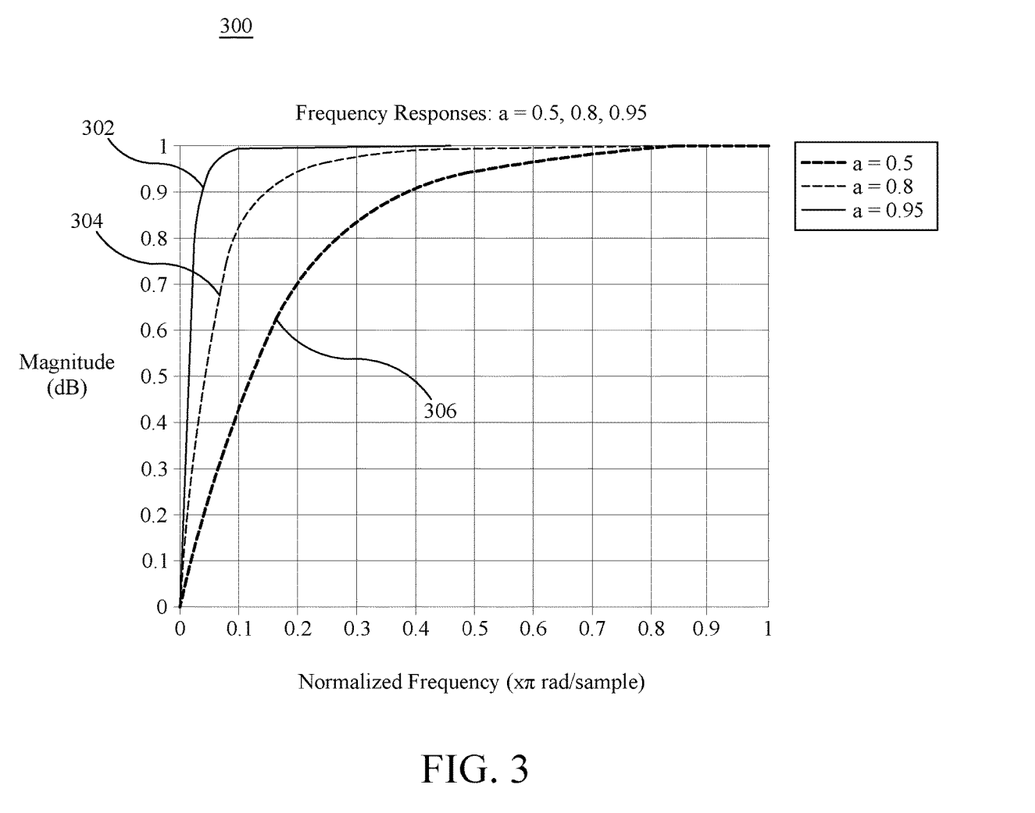
FIG. 3 is a graph of DC-block filter frequency responses according to an embodiment.

Referring to FIG. 3, a graph of frequency responses 300 when a=0.5 306, a=0.8 304, and a=0.95 302 is illustrated.

To obtain the comparable features between the velocity derived from the IMU linear acceleration, the OF sensor velocity measurement and the WE sensor velocity measurement, the DC-block filter and appropriate conversions are applied to the velocity measurements of the OF sensor, the WE sensors and the IMU. This converts the sensor measurements into transformed signals in a transform domain. The transformed signal is referred to as a feature of the original signal, i.e., the original velocity measurement. The transformed signals, i.e., features, are comparable, and the differences between the features are used to assess sensor measurements accuracy. In one embodiment, the sensor measurements are converted for multiple transform domains, e.g., velocity domain and position domain.

A well-designed DC-block filter $f_{DCB}(*)$ is used to compute the features of the original signals, i.e., the original sensor measurements, in the velocity domain and position domain that are used to compare the IMU linear acceleration derived velocity with each robot velocity measurement from each robot sensor. First, the DC-blocked filter is applied to the linear velocity $_i^U v_k^i$ that is derived from the IMU linear acceleration $_i^U a_k^i$. The resulting feature is shown in equation (10):

$$_v\Gamma_k^{IMU} = f_{DCB}(_i^U v_0 + \Sigma_{j=0}^k f_{DCB}(_i^U a_k^i)*T) = f_{DCB}(\Sigma_{j=0}^k f_{DCK}(_i^U a_k^i)*T) \quad (10)$$

The innermost $f_{DCB}(*)$ removes the DC component in $_i^U a_k^i$, e.g., gravity residual. The outside $f_{DCB}(*)$ removes the accumulated error due to the integration. The left subscript v in $_v\Gamma_k^{IMU}$ indicates the feature is in velocity domain.

The same DC-block filter is applied to $_i^U v_k^o$ and $_i^U v_k^w$, yielding equation (11):

$$_v\Gamma_k^{OF} = f_{DCB}(f_{DCB}(_i^U v_k^o)) \text{ and } _v\Gamma_k^{WE} = f = _{DCB}(f_{DCB}(_i^U v_k^w)). \quad (11)$$

After applying the double DC-block filter, the DC component and the first-order variation component embedded in the original signal are filtered out, and only the higher order signal variations are kept. The error caused by the ZGO and gravity residual are reduced significantly. The following relations hold for real data as shown in equations (12) and (13):

$$_v\Gamma_k^{IMU} \cong {}_v\Gamma_k^{OF} \quad (12)$$

and $$_v\Gamma_k^{IMU} \cong {}_v\Gamma_k^{WE} \quad (13)$$

These relations bridge the gap between theoretical formulation and practical implementation. To further reduce high frequency sensor noise, the velocities are also converted in the position domain and the DC-block filter is applied as shown in equations (14)-(16):

$$_p\Gamma_k^{IMU} = f_{DCB}(\Sigma_{j=0}^k f_{DCB}(_i^U a_k^i)*T)*T) \quad (14)$$

$$_p\Gamma_k^{OF} = f_{DCB}(f_{DCB}(\Sigma_{j=0}^k f_{DCB}(_i^U v_j^o)*T)) \quad (15)$$

$$_p\Gamma_k^{WE} = f_{DCB}(f_{DCB}(\Sigma_{j=0}^k f_{DCB}(_i^U v_j^w)*T)) \quad (16)$$

Then, as shown in equations (17) and (18):

$$_p\Gamma_k^{IMU} \cong {}_p\Gamma_k^{OF} \quad (12)$$

and $$_p\Gamma_k^{IMU} \cong {}_p\Gamma_k^{WE} \quad (13)$$

The left subscript p in $_p\Gamma_k^{IMU}$ indicates the feature is in position domain.

In assessing the feature differences, a correlation coefficient between the computed features is calculated and is used to determine the closeness or similarity between the IMU measurements and each robot sensor measurement, i.e., between OF measurements and IMU measurements and between WE measurements and IMU measurements. The similarity metrics are computed between the $k_0+1$ feature samples within the most recent $t_0$ seconds as shown in equations (19) and (20):

$$\lambda_{io} = \text{corrcoef}(_p\gamma_{(k-k_0):k}^{IMU}(:), {}_p\gamma_{(k-k_0):k}^{OF}(:)) \quad (19)$$

$$\lambda_{iw} = \text{corrcoef}(_p\gamma_{(k-k_0):k}^{IMU}(:), {}_p\gamma_{(k-k_0):k}^{WE}(:)) \quad (20)$$

where $_p\Gamma_{k-k_0):k}^{IMU}(:)$ is the sample sequence of feature $_p\Gamma_k^{IMU}$ from $(k-k_0)$ to k reshaped as a vector, and $_p\Gamma_{k-k_0):k}^{OF}(:)$ is the sample sequence of feature $_p\Gamma^{OF}$ from $(k-k_0)$ to k reshaped as a vector.

When $\lambda_{io}$ is below a threshold, e.g., 0.5, OF sensor measurements suffer from running condition errors, e.g. image glitches, and when $\lambda_{io}$ is high enough or beyond a threshold, e.g., 0.95, OF sensor measurements have acceptable accuracy. Similarly, when $\lambda_{iw}$ is low enough below a threshold, e.g., 0.5, WE measurements suffer from running condition errors, and when $\lambda_{iw}$ is high enough beyond a threshold, e.g., 0.95, WE measurements have acceptable accuracy. Therefore, when $\lambda_{io}$ is high enough or beyond a threshold, e.g., 0.95, while $\lambda_{iw}$ is low enough or below a threshold, e.g., 0.5, the fused velocity is $_i^U v_k^o$. That is, the weight assigned to the WE sensor velocity measurement is zero, and the weight assigned to the OF sensor velocity measurement is 1. When $\lambda_{iw}$ is high enough or beyond a threshold, e.g., 0.95, while $\lambda_{io}$ is low enough or below a threshold, e.g., 0.5, the fused velocity should be $_i^U v_k^w$. That is, the weight assigned to the OF sensor velocity measurement is zero, and the weight assigned to the WE sensor velocity measurement is 1. Otherwise, the fused velocity is calculated as a weighted sum of $_i^U v_k^o$ and $_i^U v_k^w$ with the weights used in the weighted sum determined by the following procedure.

To derive the weights of the velocities associated with the OF sensor and the WE sensors, the linear acceleration $_U^i a_k^i$ is assumed to be accurate without ZGO or gravity residual, and $_i^U v_k^o$ and $_i^U v_k^w$ express only sensor measurements. Therefore, as shown in equations (21) and (22), $$_i^U v_k^o = _i^U v_{k-1}^o + (_i^U a_k^i + _i^U a_{k-1}^i) * T/2 + n_k^o \quad (22)$$

$$_i^U v_k^w = _i^U v_{k-1}^w + (_i^U a_k^i + _i^U a_{k-1}^i) * T/2 + n_k^o \quad (23)$$

Assume $n_k^o$ and $n_k^w$ are the measurement noises and gaussian distributed with distributions of $N(n_l^o, m^o, \Phi^o)$ and $N(n_l^w, m^w, \Phi^w)$, respectively. The likelihood of $_i^U v_k^o$ given $_i^U a_1 \ldots _k^i$ is defined as $L(_i^U v_k^o | _i^U a_1 \ldots _k^i, _i^U v_0^o)$, and the likelihood of $_i^U v_k^w$ given $_i^U a_1 \ldots _k$ is defined as $L(_i^U v_k^w | _i^U a_1 \ldots _k^i, _i^U v_0^w)$. With the initial probabilities of $p_0^o = p_0^w = 0.5$, the weights by Bayesian formula are shown in equations (23) and (24):

$$p_k^o = p_0^o L(_i^U v_k^o | _i^U a_1 \ldots _k^i, _i^U v_0^o) / (p_0^w L(_i^U v_k^w | _i^U a_1 \ldots _k^i, _i^U v_0^w) + p_0^o L(_i^U v_k^o | _i^U a_1 \ldots _k^i, _i^U v_0^o)) \quad (23)$$

$$p_k^w = p_0^w L(_i^U v_k^w | _i^U a_1 \ldots _k^i, _i^U v_0^w) / (p_0^w L(_i^U v_k^w | _i^U a_1 \ldots _k^i, _i^U v_0^w) + p_0^o L(_i^U v_k^o | _i^U a_1 \ldots _k^i, _i^U v_0^o)) \quad (24)$$

Then the fused velocity is shown in equation (25):

$$_i^U v_k^f = p_k^w \cdot _i^U v_k^w + p_k^o \cdot _i^U v_k^o \quad (25)$$

Given the initial robot velocity $_i^U v_0$ and the linear acceleration sequence of $_i^U a_1 \ldots _k$, the likelihood of $_i^U v_k^o$ and $_i^U v_k^w$, $L(_i^U v_k^o | _i^U a_1 \ldots _k^i, _i^U v_0^o)$ and $L(_i^U v_k^w | _i^U a_1 \ldots _k^i, _i^U v_0^w)$, are computed. However, due to the ZGO and gravity residual, the formulas (1) and (2) are not valid for real data. For example, an IMU 108 with 20 milligravity offset error causes about 0.196 m/s error for the speed after one second and about 1.96 m/s error for the speed after 10 seconds. Therefore, two embodiments are used to approximate the likelihoods.

In one embodiment, the likelihood $L(_i^U v_k^o | _i^U a_1 \ldots _k^i, _i^U v_0^o)$ is approximated by the most recent $N+1$ samples, which are obtained within most recent 0.2 or 0.3 seconds, of the linear acceleration samples $_i^U a_{(k-N)} \ldots _k^i$ and the Nth previous measurement $_i^U v_{k-N}^o$ as shown below in equation (26):

$$L(_i^U v_k^o | _i^U a_1 \ldots _k^i, _i^U v_0^o) \cong L(_i^U v_k^o | _i^U a_{(k-N)} \ldots _k^i, _i^U v_{k-N}^o) \quad (26)$$

Since in a short period of time, the following approximation holds even with gravity residual and ZGO, as shown in equation (27):

$$_i^U v_k \cong _i^U v_{k-N} + \Sigma_{j=(k-N+1)}^{k} (_i^U a_j^i + _i^U a_{j-1}^i) * T/2 \quad (27)$$

the OF velocity residual is computed from as shown in equation (28):

$$\varepsilon_k^o = _i^U v_k^o - (_i^U v_{k-N}^o + \Sigma_{j=(k-N+1)}^{k} (_i^U a_j^i + _i^U a_{j-1}^i) * T/2) \quad (28)$$

Assuming that the OF sensor has Gaussian noise with distribution of $N(n_k^o; m^o, \Phi^o)$ then the likelihood of the residual $\varepsilon_k^o$ is $N(\varepsilon_k^o; m^o, \Phi^o)$ given $_i^U a_{(k-N)} \ldots _k^i$ and $_i^U v_{k-N}^o$.

Similarly, the WE velocity residual is computed as shown in equation (29):

$$\varepsilon_k^w = _i^U v_k^w = (_i^U v_{k-N}^w + \Sigma_{j=(k-N+1)}^{k} (_i^U a_j^i + _i^U a_{j-1}^i) * T/2) \quad (29)$$

Its likelihood is $N(\varepsilon_k^w; m^w, \Phi^w)$ given $_i^U a_{(k-N)} \ldots _k^i$ and $_i^U v_{k-N}^w$. Therefore, as shown in equations (30) and (31):

$$p_k^o = p_0^o N(\varepsilon_k^o; m^o, \Phi^o) / p_0^w N(\varepsilon_k^w; m^w, \Phi^w) + p_0^o N(\varepsilon_k^o; m^o, \Phi^o)) \quad (30)$$

$$p_k^w = p_0^w N(\varepsilon_k^w; m^w, \Phi^w) / p_0^w N(\varepsilon_k^w; m^w, \Phi^w) + p_0^o N(\varepsilon_k^o; m^o, \Phi^o)) = 1 - p_k^o \quad (31)$$

Both likelihood functions mainly depend on the common data $_i^U a_{(k-N)} \ldots _k^i$, while $_i^U v_{k-N}^w$ and $_i^U v_{k-N}^o$ are assumed approximately equal or their difference is ignored.

In another embodiment, features in the velocity domain are used to compute the weights. As defined in equations (32)-(34):

$$_v \Gamma_k^{IMU} = f_{DCB}(\Sigma_{j=0}^{k} f_{DCB}(_i^U a_k^i) * T) \quad (32)$$

$$_v \Gamma_k^{OF} = f_{DCB}(f_{DCB}(_i^U v_k^o)) \quad (33)$$

$$_v \Gamma_k^{WE} = f_{DCB}(f_{DCB}(_i^U v_k^w)) \quad (34)$$

If both the OF sensor and the WE sensor work properly, $_v \Gamma_k^{IMU} \cong _v \Gamma_k^{OF}$ and $_v \Gamma_k^{IMU} \cong _v \Gamma_k^{WE}$. It is known that $_v \Gamma_k^{IMU} \cong f_{DCB}(f_{DCB}(u_i^U v_k))$ where $u_i^U v_k$ is the true velocity at IMU in the user frame. Since, as shown in equation (35), $$\begin{cases} _i^U v_k^o = _i^U v_k + n_k^o \\ _i^U v_k^w = _i^U v_k + n_k^w \end{cases} \quad (35)$$

where $n_k^o$ and $n_k^w$ are the sensor noises, then, as shown in equation (36), $$\begin{cases} _v \Gamma_k^{OF} \cong _v \Gamma_k^{IMU} + f_{DCB}(f_{DCB}(n_k^o)) \\ _v \Gamma_k^{WE} \cong _v \Gamma_k^{IMU} + f_{DCB}(f_{DCB}(n_k^w)) \end{cases} \quad (36)$$

Assuming $f_{DCB}(f_{DCB}(n_k^o))$ and $f_{DCB}(f_{DCB}(n_k^w))$ are Gaussian distributed with distributions $f_{DCB}(f_{DCB}(n_k^o))$; $m^{64\ o}, \Phi^{\Gamma o})$ and $f_{DCB}(f_{DCB}(n_k^w))$; $m^{64\ w}, \Phi^{\Gamma w})$, respectively, given $_v \Gamma_k^{IMU}$, the likelihood of $_v \Gamma_k^{OF}$ is $N(_v \Gamma_k^{OF}; m^{\Gamma o} + _v \Gamma_k^{IMU}, \Phi^{\Gamma o})$, and the likelihood of $_v \Gamma_k^{WE}$ is $N(_v \Gamma_k^{WE}; m^{\Gamma w} + _v \Gamma_k^{IMU}, \Phi^{\Gamma w})$. Therefore, as shown in equation (37):

$$p_k^o = \frac{p_o^o N(_v \Gamma_k^{OF}; m^{\Gamma o} + _v \Gamma_k^{IMU}, \Phi^{\Gamma o})}{(p_0^w N(_v \Gamma_k^{WE}; m^{\Gamma w} + _v \Gamma_k^{MU}, \Phi^{\Gamma w}) + p_o^o N(_v \Gamma_k^{OF}; m^{\Gamma o} + _v \Gamma_k^{IMU}, \Phi^{\Gamma o}))} \quad (37)$$

$$p_k^w = 1 - p_k^o$$

In this embodiment, the likelihood is approximately by defining $\delta_k^o = \text{norm}(_v\Gamma_{(k-N):k}^{IMU} - _v\Gamma_{(k-N):k}^{OF})$ and $\delta_k^w = \text{norm}(_v\Gamma_{(k-N):k}^{IMU} - _v\Gamma_{(k-N):k}^{WE})$, where $_v\Gamma_{(k-N):k}^{IMU}$, $_v\Gamma_{(k-N):k}^{OF}$ and $_v\Gamma_{(k-N):k}^{WE}$ are the most recent N+1 features, which are the samples within the most recent 0.2 or 0.3 seconds. The most recent N+1 samples are used to make assessment more stable. Then the weights are shown below in equations (38) and (39):

$$p_k^o = \frac{\delta_k^w}{(\delta_k^w + \delta_k^o)} \quad (38)$$

$$p_k^w = \frac{\delta_k^o}{(\delta_k^w + \delta_k^o)} = 1 - p_k^o \quad (39)$$

Therefore, the fused robot velocity is $_i^U v_k^f = p_k^w \cdot _i^U v_k^w + p_k^o \cdot _i^U v_k^o$.

Having fused the velocities of the OF sensor and WE, the robot position is estimated. For the dynamics of the robot, the robot is assumed to be running at constant acceleration. Its state is $x_k = [x_k, \dot{x}_k, \ddot{x}_k, y_k, \dot{y}_k, \ddot{y}_k]$, where $x_k$ and $y_k$ are the position at instant k.

The dynamics of the robot are given by $x_k = Fx_{k-1} + w_k$ and $z_k = Hx_k + n_k$, where F and H are shown below in equations (40) and (41), respectively:

$$F = \begin{bmatrix} 1 & T & T^2/2 & 0 & 0 & 0 \\ 0 & 1 & T & 0 & 0 & 0 \\ 0 & 0 & 1 & 0 & 0 & 0 \\ 0 & 0 & 0 & 1 & T & T^2/2 \\ 0 & 0 & 0 & 0 & 1 & T \\ 0 & 0 & 0 & 0 & 0 & 1 \end{bmatrix} \quad (41)$$

$$H = \begin{bmatrix} 0 & 1 & 0 & 0 & 1 & 0 \\ 0 & 0 & 1 & 0 & 0 & 1 \end{bmatrix} \quad (42)$$

and $w_k$ and $n_k$ are the dynamic process noise and measurement noise. It is assumed that $w_k$ is of Gaussian distribution with zero mean and covariance of $Q_k$ and that $n_k$ is of Gaussian distribution with zero mean and covariance of $R_k$. T is the sampling period.

The measurements are $z_k = [_i^U v_k^f[0] \; _i^U a_k^i[0] \; _i^U v_k^f[1] \; _i^U v_k^i[1]]$. The Kalman filter is applied to estimate position of the robot as shown in equations (43)-(48):

$$\bar{x}_{k|k-1} = F\hat{x}_{k-1|k-1} \quad (43)$$

$$P_{k|k-1} = FP_{k-1|k-1}F' + Q_k \quad (44)$$

$$\in_k = z_k - H\bar{x}_{k|k-1} \quad (45)$$

$$K_k = P_{k|k-1}H'^{(HP_{k|k-1}H' + R_k)} \quad (46)$$

$$\hat{x}_{k|k} = K_k \mathfrak{I}_k \quad (47)$$

$$P_{k|k} = (I - K_k H)P_{k|k-1}(I - K_k H' + K_k R_k K'_k \quad (48)$$

The computed robot position is $[\hat{x}_{k|k}[0] \; \hat{x}_{k|k}[3]]$.

Figure 4:
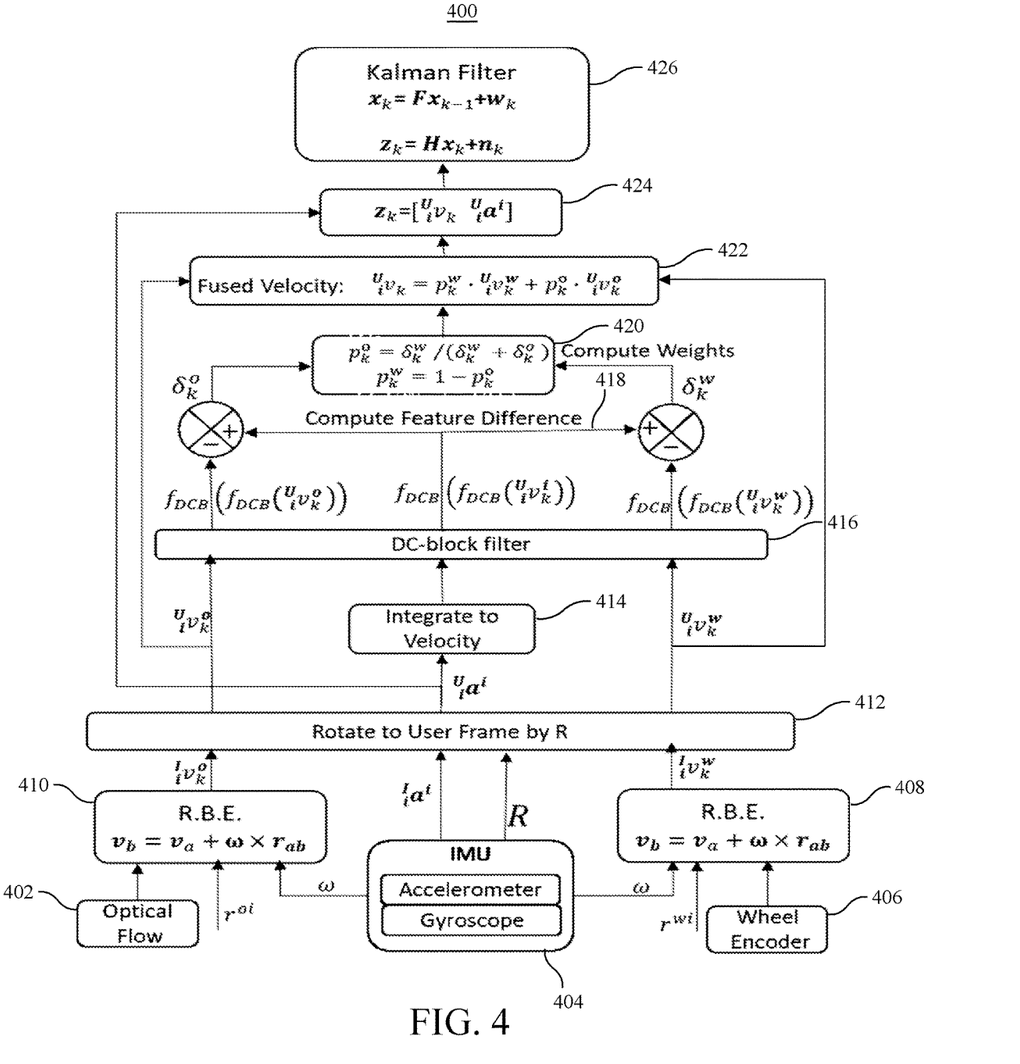
FIG. 4 is a representation of velocity fusion and location and trajectory estimation according to an embodiment.

The velocity fusion and position estimation described herein are summarized in FIG. 4. Further, FIG. 4 can be mapped to FIG. 2 for many of the steps, i.e., in some steps, FIG. 4 shows additionally details, for example, various equations described herein and specific inputs, for certain steps described in FIG. 2. Therefore, the interested reader is encouraged to compare FIG. 2 with FIG. 4 for ease of understanding.

Initially, flowchart 400 includes inputs from the optical flow 402, the IMU 404 and the wheel encoder 406. Blocks 408 and 410 represent processing the various inputs shown to provide velocity outputs associated with the WE 406 and the OF 402, respectively. The velocity outputs from blocks 408 and 410 are then merged with information from the IMU 404 as shown in step 412 described as rotate to user frame by R. Integrate to velocity occurs in step 414. Then the DC-block filter is applied before and after each integration operation so that only the signal variation is kept as shown in step 416. Computing feature difference occurs in step 418, followed by the computing weights in step 420. Fusion of the velocities of the WE 406 and OF 402 occurs in step 424. Block 424 represents inputting the robot dynamics and linear acceleration, with the output being sent to the Kalman filter for filtering as shown in step 426.

Figure 5:
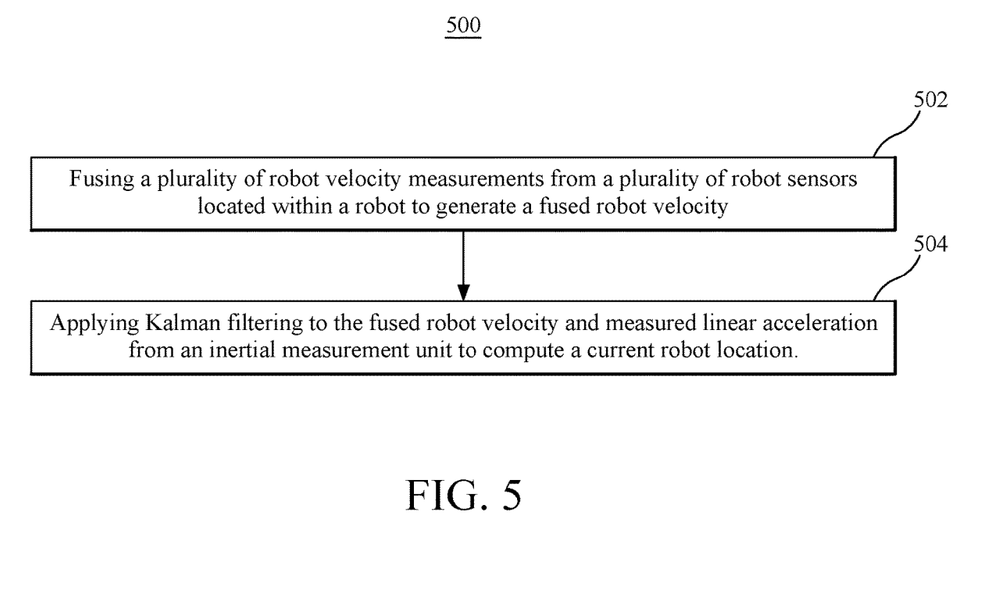
FIG. 5 is a flowchart of a method for estimating a trajectory of a robot according to an embodiment.

According to an embodiment, there is a flowchart 500 of a method for estimating a trajectory of a robot as shown in FIG. 5. The method includes: in step 502, fusing a plurality of robot velocity measurements from a plurality of robot sensors located within a robot to generate a fused robot velocity; and in step 504, applying Kalman filtering to the fused robot velocity and measured linear acceleration from an inertial measurement unit to compute a current robot location.

Embodiments describe fusing the linear acceleration from the IMU 404, the velocity measurements from the OF sensor 402 and the measurements from the WE sensor 406 to estimate the robot position. First, the linear acceleration from the IMU is immune to the running condition induced measurement errors that OF sensor 402 and WE sensor 406 are prone to, e.g., slips of the encoder wheel or low quality caused by the floor texture. Second, although the linear acceleration are not directly used to assess the accuracies of the OF sensor 402 and WE sensor 406, after converting their information into feature domains, the similarity metric can be used to reject the bad OF and/or WE measurements and the derived weights can be used to fuse the OF and WE measurements. Third, the robot position is estimated via Kalman filter. The embodiments described herein in a real system exhibit good performance, robustness and are computationally efficient.

Systems and methods for processing data according to exemplary embodiments of the present invention can be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention. Such software may run on a processor which is housed within the device, e.g., a robot or other device, which contains the sensors or the software may run on a processor or computer housed within another device, e.g., a system controller, a game console, a personal computer, etc., which is in communication with the device containing the sensors. In such a case, data may be transferred via wireline or wirelessly between the device containing the sensors and the device containing the processor which runs the software which performs the bias estimation and compensation as described above. According to other exemplary embodiments, some of the processing described above may be performed in the device containing the sensors, while the remainder of the processing is performed in a second device after receipt of the partially processed data from the device containing the sensors.

The above-described exemplary embodiments are intended to be illustrative in all respects, rather than restrictive, of the present invention. Thus, the present invention is capable of many variations in detailed implementation that can be derived from the description contained herein by a person skilled in the art. For example, although the foregoing exemplary embodiments describe, among other things, the use of inertial sensors to detect movement of a device, other types of sensors (e.g., ultrasound, magnetic or optical) can be used instead of, or in addition to, inertial sensors in conjunction with the afore-described signal processing. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs).

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed." For example, the IMU 108 could include a processor. Alternatively, the processor/processing unit could be located where desired within the robot 100 to perform the various calculations, estimations, image processing and the like described herein.

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

What is claimed is:

1. A method for estimating a trajectory of a robot, the method comprising:
   fusing a plurality of robot velocity measurements from a plurality of robot sensors located within the robot to generate a fused robot velocity;
   applying Kalman filtering to the fused robot velocity and measured linear acceleration from an inertial measurement unit; and
   computing a current robot location.

2. The method of claim 1, wherein fusing the plurality of robot velocity measurements comprises fusing an optical flow sensor velocity measurement and a wheel encoder sensor velocity measurement.

3. The method of claim 2, wherein fusing the optical flow sensor velocity measurement and the wheel encoder sensor velocity measurement comprises computing a weighted sum of the optical flow sensor velocity measurement and the wheel encoder sensor velocity measurement.

4. The method of claim 3, wherein fusing the optical flow sensor velocity measurement and the wheel encoder sensor velocity measurement further comprises using an inertial measurement unit linear acceleration derived velocity to determine an optical flow sensor velocity measurement weight and a wheel encoder sensor velocity measurement weight.

5. The method of claim 4, wherein using the inertial measurement unit linear acceleration derived velocity comprises:
   converting the optical flow sensor velocity measurement, the wheel encoder sensor velocity measurement, and the inertial measurement unit linear acceleration derived velocity into transformed signals in a transform domain, each transformed signal comprising a feature;
   identifying differences between an inertial measurement unit linear acceleration derived velocity feature and an optical flow sensor velocity measurement feature;
   identifying differences between the inertial measurement unit linear acceleration derived velocity feature and a wheel encoder sensor velocity measurement feature; and
   using the identified differences to determine the optical flow sensor velocity measurement weight and the wheel encoder sensor velocity measurement weight.

6. The method of claim 5, wherein using the identified differences comprises:
   assigning a value of 1 to the optical flow sensor velocity measurement weight and a value of 0 to the wheel encoder sensor velocity measurement weight when a similarity metric between the inertial measurement unit linear acceleration derived velocity feature and the optical flow sensor velocity measurement feature is at least 0.95 and a similarity metric between the inertial measurement unit linear acceleration derived velocity feature and the wheel encoder sensor velocity measurement feature is less than 0.5; and
   assigning a value of 0 to the optical flow sensor velocity measurement weight and a value of 1 to the wheel encoder sensor velocity measurement weight when the similarity metric between the inertial measurement unit linear acceleration derived velocity feature and the optical flow sensor velocity measurement feature is less than 0.5 and the similarity metric between the inertial measurement unit linear acceleration derived velocity feature and the wheel encoder sensor velocity measurement feature is at least 0.95.

7. The method of claim 5, wherein using the identified differences comprises using recent samples of linear acceleration extending from a given time and a previous velocity measurement at the given time to assign weights.

8. The method of claim 5, wherein using the identified differences comprises using the optical flow sensor velocity measurement feature, the wheel encoder sensor velocity measurement feature and the inertial measurement unit linear acceleration derived velocity feature in a velocity domain to assign weights.

9. The method or robot of claim 5, wherein the feature is generated by a DC-Block filter which transforms a velocity signal, wherein the velocity signal is generated by one or more of the optical flow sensor, the wheel encoder or the inertial measurement unit.

10. The method of claim 1, wherein applying Kalman filtering further comprises using the inertial measurement unit linear acceleration, the weighted combination of the optical flow velocity and wheel encoder measurements, and robot dynamics in the Kalman filtering.

11. The method of claim 1, wherein the robot is a robot vacuum cleaner.

12. A robot configured for estimating a trajectory of the robot, the robot comprising:
   at least one processor configured to fuse a plurality of robot velocity measurements from a plurality of robot sensors located within the robot to generate a fused robot velocity;
   the at least one processor configured to apply Kalman filtering to the fused robot velocity and measured linear acceleration from an inertial measurement unit; and
   the at least one processor configured to compute a current robot location.

13. The robot of claim 12, wherein to fuse the plurality of robot velocity measurements comprises the at least one processor fusing an optical flow sensor velocity measurement and a wheel encoder sensor velocity measurement.

14. The robot of claim 13, wherein fusing the optical flow sensor velocity measurement and the wheel encoder sensor velocity measurement comprises the at least one processor computing a weighted sum of the optical flow sensor velocity measurement and the wheel encoder sensor velocity measurement.

15. The robot of claim 14, wherein fusing the optical flow sensor velocity measurement and the wheel encoder sensor velocity measurement further comprises the at least one processor using an inertial measurement unit linear acceleration derived velocity to determine an optical flow sensor velocity measurement weight and a wheel encoder sensor velocity measurement weight.

16. The robot of claim 15, wherein using the inertial measurement unit linear acceleration derived velocity comprises:
   the at least one processor converting the optical flow sensor velocity measurement, the wheel encoder sensor velocity measurement, and the inertial measurement unit linear acceleration derived velocity into transformed signals in a transform domain, each transformed signal comprising a feature;
   the at least one processor identifying differences between an inertial measurement unit linear acceleration derived velocity feature and an optical flow sensor velocity measurement feature;
   the at least one processor identifying differences between the inertial measurement unit linear acceleration derived velocity feature and a wheel encoder sensor velocity measurement feature; and
   the at least one processor using the identified differences to determine the optical flow sensor velocity measurement weight and the wheel encoder sensor velocity measurement weight.

17. The robot of claim 16, wherein using the identified differences comprises:
   the at least one processor assigning a value of 1 to the optical flow sensor velocity measurement weight and a value of 0 to the wheel encoder sensor velocity measurement weight when a similarity metric between the inertial measurement unit linear acceleration derived velocity feature and the optical flow sensor velocity measurement feature is at least 0.95 and a similarity metric between the inertial measurement unit linear acceleration derived velocity feature and the wheel encoder sensor velocity measurement feature is less than 0.5; and
   the at least one processor assigning a value of 0 to the optical flow sensor velocity measurement weight and a value of 1 to the wheel encoder sensor velocity measurement weight when the similarity metric between the inertial measurement unit linear acceleration derived velocity feature and the optical flow sensor velocity measurement feature is less than 0.5 and the similarity metric between the inertial measurement unit linear acceleration derived velocity feature and the wheel encoder sensor velocity measurement feature is at least 0.95.

18. The robot of claim 16, wherein using the identified differences comprises the at least one processor using recent samples of linear acceleration extending from a given time and a previous velocity measurement at the given time to assign weights.

19. The robot of claim 16, wherein using the identified differences comprises the at least one processor using the optical flow sensor velocity measurement feature, the wheel encoder sensor velocity measurement feature and the inertial measurement unit linear acceleration derived velocity feature in a velocity domain to assign weights.

20. The robot of claim 12, wherein applying Kalman filtering further comprises using the inertial measurement unit linear acceleration, the weighted combination of the optical flow velocity and wheel encoder measurements, and robot dynamics in the Kalman filtering.

21. The robot of claim 12, wherein the robot is a robot vacuum cleaner.

* * * * *